March 29, 1949.  A. J. KRESHOCK  2,465,541
TAPPING ACCESSORY FOR DRILL PRESSES
Filed March 12, 1947
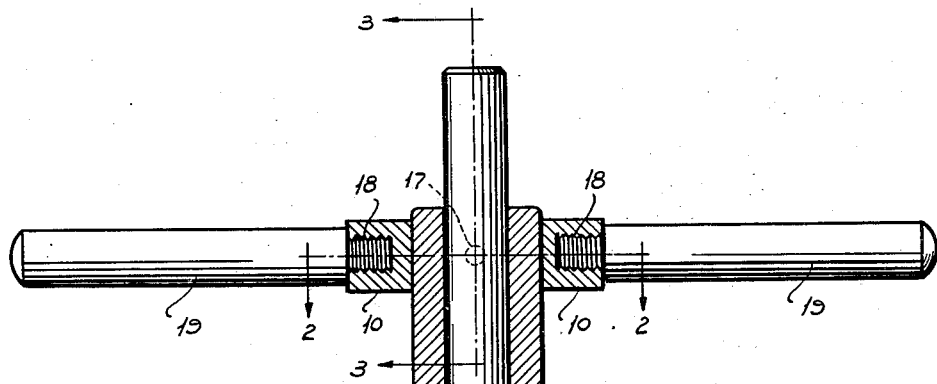
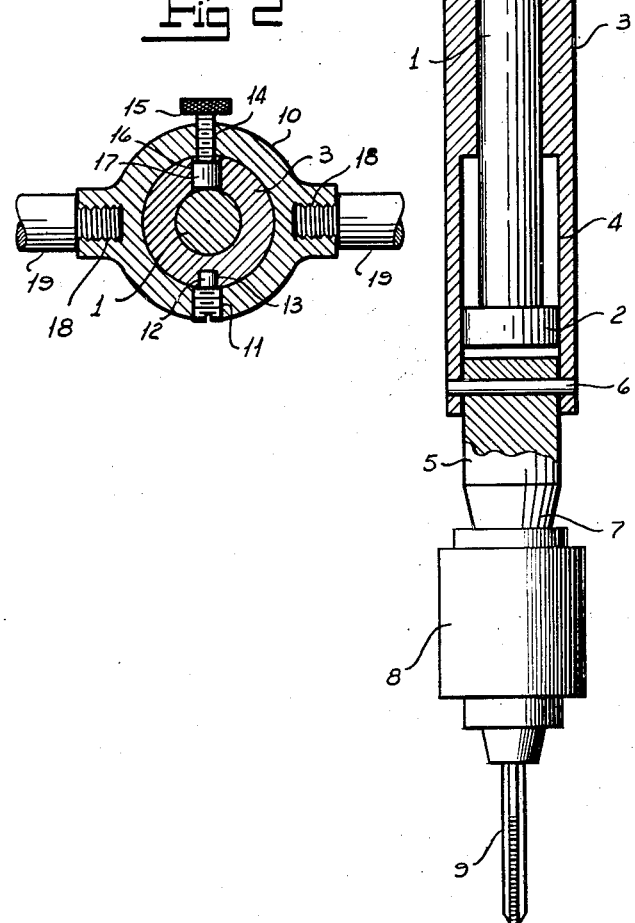
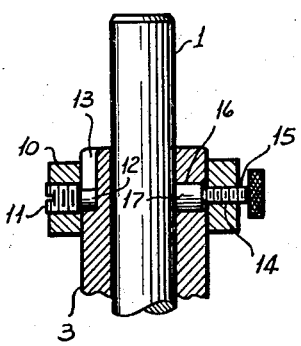
INVENTOR
ANTHONY J. KRESHOCK
BY
ATTORNEY Patented Mar. 29, 1949

2,465,541

UNITED STATES PATENT OFFICE 2,465,541

TAPPING ACCESSORY FOR DRILL PRESSES

Anthony J. Kreshock, Hillside, N. J.

Application March 12, 1947, Serial No. 734,195

5 Claims. (Cl. 10—147)

This invention is an accessory to facilitate the tapping of holes for machine screws, studs and the like.

According to conventional practice, it is common in preparing a hole to receive a threaded screw, stud or the like, to first bore a hole in the piece to be tapped and thereafter tap such hole. It is desirable and often essential that holes so tapped be normal or perpendicular to the face of the stock in which they are formed. The usual hand-operated devices for tapping holes do not insure such a condition and considerable skill and experience is required to manipulate them in a fairly accurate way.

Various expedients have been resorted to to assist in the proper tapping of holes and in practically every case where satisfactory devices have been suggested, they require separate stands, guides and similar devices which are useful for this and no other purpose. They are expensive and the majority of small shop owners do not wish to expend the cost thereof and so perform this work either by old-fashioned hand manipulation or attempt to do it, in some cases, by mounting the tap in a lathe or drill press and power driving such tap from the lathe or drill press by operating it at relatively slow speed. This practice, however, is not good for various reasons. In the first place, the speeds which it is possible to obtain in this manner are not slow enough. Moreover the tap is constantly driven in a forward direction, whereas a cleaner cut results and the tap works better if its rotation may be reversed from time to time as the tapping operation proceeds. When this is done, the tap is not overheated, the cuttings are cleared more effectively and a sharper, cleaner thread results.

With the foregoing considerations in mind, the object of the present invention is to provide an accessory which may be used with a drill press but this accessory is so constituted that it has no driving connection between the spindle of the drill press and the tap. In fact, the drill press is utilized solely for the purpose of holding a guide post coaxially with the hole which is to be tapped. On the post is mounted a tubular sleeve and to this sleeve is attached one or more handles by which the sleeve may be manually rotated coaxially with the post. To the lower end of the sleeve is affixed a chuck and this chuck is adapted to hold the tap. According to this invention, the tap feeds itself.

Holes to be tapped are commonly drilled on a drill press, the stock in which such holes are formed being supported on the table of the press. Consequently it is a simple matter to bore these holes and thereafter raise the spindle of the drill press, remove the drill from the spindle chuck and substitute for it the guide post of the accessory of this invention. Thereafter the spindle may be lowered to enter the point of the tap into the previously bored hole, after which the press spindle is left free and without power coupling. The handles of the sleeve may then be grasped by the operator and said sleeve turned to effect the tapping operation by the manual power thus applied.

When thus used, the tap may be rotated back and forth according to the desire of the operator. It feeds itself as the cutting proceeds and a clean accurate thread will be formed. After the hole has been threaded to the depth or thickness desired, the rotation of the sleeve is reversed and the tap is manually unscrewed, leaving a good job. The same setting of the bed of the drill press, utilized for the boring of the holes, may be used also for the tapping of such holes and consequently uniform accuracy will result.

During the tapping operations, the spindle of the drill press serves merely as a support for the guide post of this invention, although it may be utilized to raise or lower the tap away from and to the work to be done and to hold it in lifted position while the work is shifted and centered.

Advantages of the present invention reside in its extreme simplicity, its low cost and its high efficiency. It does not require special supporting devices nor expensive or bulky guides, for it utilizes conventional drill press parts to insure stability and alinement.

Other features of the invention will be apparent from the following detailed description and from the accompanying drawings.

In the accompanying drawings, I have illustrated the preferred form of the invention but the same is to be understood as illustrative only and not as defining the limits of the invention.

In said drawings:

Figure 1 is a vertical central section through my accessory, showing certain parts in elevation in the interests of clearness.

Figure 2 is a section on the line 2—2.

Figure 3 is a section on the line 3—3 of Figure 1.

In the accompanying drawings, I designates a guide post, the upper end of which is adapted to be detachably engaged and gripped in the conventional chuck of a drill press, so as to be supported firmly and fixedly thereon, coaxially of the spindle for the press. This post I is conveniently made solid and cylindrical and of substantially uniform diameter from its top to near its bottom where it is provided with a head 2 of somewhat larger diameter.

A tubular sleeve 3 closely encircles the post 1 for the greater portion of its length so as to have a snug rotary fit therewith but its lower end is counter-bored at 4 to a diameter adapted to have a relatively close fit with the head 2, of the guide post. The depth of the counter-bore 4 is substantially equal but somewhat greater than the length of a conventional tap.

Situated in the lower end of the counter-bore 4 is a connector 5. This connector is snugly fitted into the counter-bore and is rigidly affixed therein by a pin 6 passing through the connector and through the opposite walls of the sleeve so as to lock the connector and the sleeve 3 together for conjoint rotation. The lower end of the connector 5 may be threaded or provided with a Morse taper the latter of which is shown at 7, for cooperation with the chuck 8 which is adapted to hold the tap 9.

Embracing the upper end of the sleeve 3 is a hub 10. This hub is locked against rotation relative thereto by means of a screw 11 having reduced end 12 which projects into a keyway 13 formed in the sleeve 3. The hub is also provided with a threaded hole 14 to receive a locking screw 15 which is alined with a perforation 16 in the sleeve. In this perforation is positioned a fibre plug 17 so that when the screw 15 is forced against the plug, said plug will in turn be caused to frictionally bear against the post 1 to lock the sleeve to the post. This is convenient when it is desired to hold the tap in raised position and out of contact with the work. When the tap is operated, however, the screw 15 should be loosened to permit the sleeve to freely rotate on the supporting post 1.

Diametrically opposite sides of the hub are provided with threaded sockets 18 and into these sockets are screwed operating handles 19 of any convenient length. These handles are adapted to be grasped by the operator for rotation of the sleeve 3 and the tap 9 which is rigidly held in the chuck 8.

In Figure 1, the sleeve is shown in raised position and it will be noted that an appreciable length of the counter-bore 4 extends above the head 2 of the post 1. This space allows for the self-feeding of the tap as the threading operation proceeds.

The device of this invention is extremely compact and ordinarily may be left in the assembled condition shown in Figure 1, to be mounted or detached from the chuck of the drill press spindle, as a unit. However, if desired to store it when not in use in a drawer or other receptacle of confined dimensions, the handles 19 may be unscrewed from the sockets 18 and the chuck 8 may be removed from the connector 5 to provide for compact storage.

All parts of the construction are preferably made of steel, the post 1 and the connector 5 being of hardened tool steel and the sleeve 3 of drawn tubing, preferably tempered to minimize wear.

The accessory of this invention is primarily designed for tapping but it is highly efficient when used for reaming and other related work where a firm support and guide are essential for the performance of accurate hand operations.

The foregoing detailed description sets forth the invention in its preferred practical form but the invention is to be understood as fully commensurate with the appended claims.

Having thus fully described my invention, what I claim as new and desire to secure by Letters Patent is:

1. A tapping accessory for drill presses, comprising: a post the upper end of which is adapted to be gripped in the chuck of a drill press and the lower end of which is provided with an enlarged head, a sleeve embracing said post with the greater portion of the length of the sleeve having a close rotary fit on the post and the lower end of the sleeve being counter-bored to provide a chamber rotatably receiving the head of the post, means secured within the lower end of the counter-bore and below the head of the post, with the free end of said means adapted to connect a tap axially of said post, a hub embracing the upper end of the sleeve, a pin threaded into said hub and projecting into a keyway in the sleeve to lock the hub to the sleeve against relative rotation, a friction plug situated in a perforation in the sleeve within the hub, a set-screw threaded into the hub in alinement with said plug and adapted to be tightened against the plug to frictionally hold the sleeve and the post against relative coaxial movement, and handles secured to and extending radially of the hub for rotating the sleeve when pressure on the plug is relieved.

2. A construction as set forth in claim 1 wherein said enlarged head is axially movable in said chamber.

3. A construction as set forth in claim 1 wherein said means is axially and rotatably fixed with respect to said sleeve.

4. A construction as set forth in claim 1 wherein there is connected axially of said means a tap comprising an exteriorly threaded member, with generally longitudinal interruptions on the threads defining thread cutting edges.

5. A tapping accessory for drill presses, comprising: a post the upper end of which is adapted to be gripped in the chuck of a drill press and the lower end of which is provided with an enlarged head, a sleeve embracing said post with the greater portion of the length of the sleeve having a close rotary fit with the post and the lower end of the sleeve being counterbored to provide a chamber rotatably receiving the head of the post, said enlarged head being axially movable in said chamber, means secured against rotation and axial movement with respect to said sleeve at the lower end of the counter-bore below the head of the post and the free end of said means having secured thereto, axially of said sleeve, a tap, said tap comprising an exteriorly threaded member, with generally longitudinal interruptions on the threads defining thread cutting edges, a hub embracing the upper end of the sleeve and secured against rotation thereon, and operating handles secured to and extending radially of said hub.

ANTHONY J. KRESHOCK.

REFERENCES CITED

The following references are of record in the file of this patent:

UNITED STATES PATENTS

| Number | Name | Date |
|---|---|---|
| 1,677,473 | Gast | July 17, 1928 |
| 2,358,249 | Portuondo | Sept. 12, 1944 |

OTHER REFERENCES

Publication, "Tool and Die Journal," p. 120, Oct. 1946.